United States Patent
Colavincenzo et al.

(10) Patent No.: US 12,180,964 B1
(45) Date of Patent: Dec. 31, 2024

(54) APPARATUS AND METHOD FOR CONTROLLING A VEHICLE AIR COMPRESSOR TO TRACK WATER CONTENT IN COMPRESSOR OIL

(71) Applicant: Bendix Commercial Vehicle Systems LLC, Avon, OH (US)

(72) Inventors: David D Colavincenzo, Castalia, OH (US); Jessica H Mosier, Bay Village, OH (US); Royal Ricky Rodrigues, Lakewood, OH (US); Gilles Hebrard, Lisieux (FR); Jean-Baptiste Marescot, Manerbe (FR)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/624,712

(22) Filed: Apr. 2, 2024

(51) Int. Cl.
*F04C 28/28* (2006.01)
*B60T 17/02* (2006.01)

(52) U.S. Cl.
CPC ............... *F04C 28/28* (2013.01); *B60T 17/02* (2013.01); *F04C 2270/075* (2013.01)

(58) Field of Classification Search
CPC ........................ F04C 28/28; F04C 2270/075
See application file for complete search history.

(56) References Cited

U.S. PATENT DOCUMENTS

| | | |
|---|---|---|
| 4,431,390 A | 2/1984 | Hart |
| 8,768,523 B2 | 7/2014 | Hamdan |
| 8,781,636 B2 | 7/2014 | Hamdan |
| 8,849,604 B2 | 9/2014 | Rowe |
| 9,145,893 B2 | 9/2015 | Hamdan |
| 11,519,411 B2 * | 12/2022 | Feiler ................... G01N 11/04 |
| 2004/0136840 A1 | 7/2004 | Doerr |
| 2008/0206085 A1 | 8/2008 | Zieglgansberger |
| 2011/0011663 A1 | 1/2011 | Hebrard |
| 2011/0070100 A1 | 3/2011 | Mcsweeney |
| 2012/0316713 A1 | 12/2012 | Pfeffer |
| 2018/0106520 A1 | 4/2018 | Wallis |
| 2019/0001954 A1 | 1/2019 | Ali |
| 2019/0203716 A1 | 7/2019 | Borkowski |
| 2021/0010481 A1 | 1/2021 | Plow |
| 2023/0356699 A1 * | 11/2023 | Bebon ................... F04B 49/10 |

\* cited by examiner

*Primary Examiner* — Connor J Tremarche
(74) *Attorney, Agent, or Firm* — Cheryl L. Greenly; Brian E. Kondas; Geoffrey Kudlo

(57) ABSTRACT

An apparatus is provided for controlling a vehicle air compressor having compressor oil to track water content in the compressor oil due to condensation during operation of the compressor over a plurality of time intervals. The apparatus comprises a data storage unit arranged to store a condensation control algorithm. The apparatus also comprises a processing unit arranged to apply the condensation control algorithm to calculate a net rate of condensation of water in the compressor oil during operation of the compressor over a first time interval of the plurality of time intervals, and maintain a running total of how much water is in the compressor oil at any given time over the first time interval to enable the compressor to operate in different modes of operation based upon the running total of how much water is in the compressor oil.

5 Claims, 5 Drawing Sheets

APPARATUS AND METHOD FOR CONTROLLING A VEHICLE AIR COMPRESSOR TO TRACK WATER CONTENT IN COMPRESSOR OIL

BACKGROUND

The present application relates to air charging systems and is particularly directed to an apparatus and method for controlling a vehicle air compressor having compressor oil to track water content in the compressor oil due to condensation during operation of the compressor.

One type of air compressor used in air charging systems is a rotary air compressor, such as a screw compressor. Screw compressors use injected oil to lubricate, absorb heat, and seal compressor components. Due to their low vibration characteristics (i.e., low noise, vibration, and harshness), screw compressors may be used in air charging systems of heavy vehicles, such as trucks including electric trucks.

A typical vehicle air charging system includes a screw compressor which builds air pressure for use in other vehicle air systems, such as a vehicle air braking system. Air charging system pressure is controlled between a preset maximum pressure level and a preset minimum pressure level by monitoring the air pressure in a supply reservoir. When the supply reservoir air pressure becomes greater than that of a preset "cut-out" pressure setting, the compressor stops building air. It may also cause an air dryer downstream from the compressor to go into a regeneration mode. As the supply reservoir air pressure drops to a preset "cut-in" pressure setting, the compressor returns back to building air and the air dryer to an air drying mode.

The air dryer is an in-line filtration system that removes water from the compressor discharge air after it leaves the compressor. This results in cleaner, drier air being supplied to the vehicle air braking system, and aids in the prevention of air line and component freeze ups in winter weather. Removing water also prevents corrosion. The air dryer typically uses a replaceable cartridge containing a desiccant material. The air moves through the desiccant material which removes most of the water.

When the compressor is started and temperatures within the compressor are below a dew point temperature, water condensate is created. The compressor is run until the water is vaporized and carried away in the compressor discharge air. Any remaining water could oxidize on surfaces of uncoated components of the compressor. This would lead then to poor lubrication of bearings resulting in degraded performance of the compressor components and/or degraded performance of overall compressor function. Accordingly, those skilled in the art continue with research and development efforts in the field of vehicle air charging systems.

SUMMARY

In accordance with one embodiment, an apparatus is provided for controlling a vehicle air compressor having compressor oil to track water content in the compressor oil due to condensation during operation of the compressor over a plurality of time intervals. The apparatus comprises a data storage unit arranged to store a condensation control algorithm. The apparatus also comprises a processing unit arranged to apply the condensation control algorithm to calculate a net rate of condensation of water in the compressor oil during operation of the compressor over a first time interval of the plurality of time intervals, and maintain a running total of how much water is in the compressor oil at any given time over the first time interval to enable the compressor to operate in different modes of operation based upon the running total of how much water is in the compressor oil.

In accordance with another embodiment, an apparatus is provided for controlling a vehicle air compressor having compressor oil to track water content in the compressor oil due to condensation during operation of the compressor. The apparatus comprises a data storage unit for storing a condensation control algorithm. The apparatus also comprises a processing unit for applying the condensation control algorithm to run the compressor in different modes of operation including (i) a first mode of operation in which water content in the compressor oil is below a first water limit threshold, (ii) a second mode of operation in which water content in the compressor oil is between the first water limit threshold and a second water limit threshold, and (iii) a third mode of operation in which water content in the compressor oil is above the second water limit threshold.

In accordance with yet another embodiment, a method is provided of operating a vehicle air compressor having compressor oil to track water content in the compressor oil due to condensation during operation of the compressor. The method comprises retrieving from memory a first value that is representative of water content previously accumulated in the compressor oil, and calculating a second value that is representative of water content presently accumulating in the compressor oil. The method also comprises summing the first and second values to provide a third value that is representative of total water content presently accumulated in the compressor oil. The method further comprises storing in the memory the third value in place of the first value to allow water content in the compressor oil due to condensation during operation of the compressor to be tracked.

In accordance with still another embodiment, an apparatus is provided for controlling a vehicle air compressor having compressor oil to track water content in the compressor oil due to condensation during operation of the compressor. The apparatus comprises a data storage unit for storing a condensation control algorithm. The apparatus also comprises a processing unit arranged to apply the condensation control algorithm to run the compressor in a normal mode of operation and a limp-home mode of operation. The compressor is able to transition from the normal mode of operation to the limp-home mode of operation but unable to transition from the limp-home mode of operation to the normal mode of operation.

DETAILED DESCRIPTION

Figure 1:
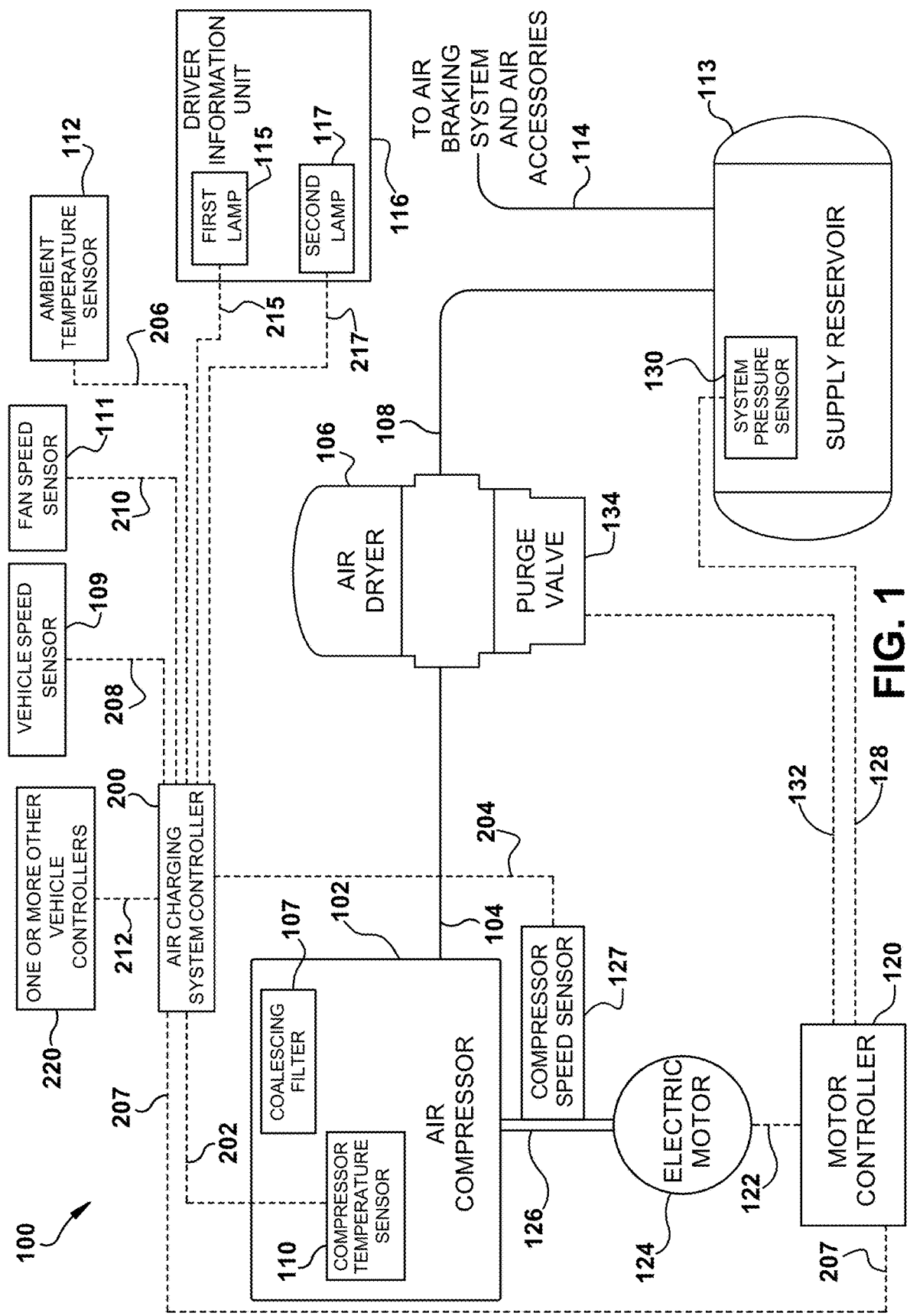
FIG. 1 is a schematic diagram of an example vehicle air charging system including an air charging system controller constructed in accordance with an embodiment.

Referring to FIG. 1, a schematic diagram of an example vehicle air charging system 100 including an air charging system controller 200 constructed in accordance with an embodiment is illustrated. Vehicle air charging system 100 includes a rotating type of air compressor 102 that generates compressed air in conventional manner. An example rotary air compressor is a screw compressor in which oil is injected to lubricate and seal a pair of screws that rotate and cooperate together to deliver compressed air. Structure and operation of screw compressors are known and, therefore, will not be described.

In FIG. 1, solid lines represent pneumatic/hydraulic lines between components, dashed lines represent electrical lines between components, and double-solid lines represent mechanical couplings between components.

A first discharge line 104 is pneumatically connected between the compressor 102 and an air dryer 106. A second discharge line 108 is pneumatically connected between the air dryer 106 and a supply reservoir 113. Although only one supply reservoir is shown, it is conceivable that a plurality of supply reservoirs be used. A system pressure sensor 130 is disposed in the supply reservoir 113. Air supply line 114 is pneumatically connected between the supply reservoir 113 and air braking system and air accessories (not shown) of the vehicle.

A motor controller 120 controls on line 122 an associated electric motor 124 that is operatively coupled on line 126 to the compressor 102 to drive the compressor 102. A compressor speed sensor 127 is operatively coupled to line 126 to provide an electrical signal on line 204 to an input port of the air charging system controller 200, which electrical signal is indicative of rotational shaft speed of the compressor 102. The compressor speed sensor 127 may comprise an encoder, a resolver, or tachometer, for example. Other types of speed sensors are possible.

The motor controller 120 communicates with the motor 124 to control the compressor 102 to maintain air charging system pressure (i.e., the air pressure in the supply reservoir 113) between a preset maximum pressure level and a minimum preset pressure level. The signal on line 128 is indicative of system air pressure in the supply reservoir 113.

When air pressure in the supply reservoir 113 becomes greater than that of a preset "cut-out" pressure setting, the motor controller 120 controls the motor 124 to stop the compressor 102 from building air. The motor controller 120 also controls on line 132 a purge valve 134 to purge air from the air dryer 106 in a purge mode. When air pressure in the supply reservoir 113 drops to a preset "cut-in" pressure setting, the motor controller 120 returns the compressor 102 back to building air and the air dryer 106 to an air drying mode.

The motor 124 is shown in FIG. 1 connected to and controlled by the motor controller 120. However, it is conceivable that the air charging system controller 200 be connected to communicate with the motor 124 or the motor controller 120, or both, to monitor the pressure on line 128 and to control the motor 124 and the purge valve 134. It is also conceivable that the motor controller 120 and the air charging system controller 200 may be combined as a single controller.

The compressor 102 includes a coalescing filter 107 and a compressor temperature sensor 110. The coalescing filter 107 separates liquid from gas and keeps the liquid inside the compressor 102. The compressor temperature sensor 110 provides an electrical signal on line 202 to an input port of the air charging system controller 200, which electrical signal is indicative of compressor system temperature (i.e., the temperature of internal air in the compressor 102) when the compressor 102 is running.

Although the coalescing filter 107 is shown in FIG. 1 as being located inside of the compressor 102, it is conceivable that the coalescing filter 107 be located outside of the compressor 102. For example, the coalescing filter 107 may be located inside of the air dryer 106. Other locations outside of the compressor 102 are possible.

An ambient temperature sensor 112 provides an electrical signal on line 206, which electrical signal is indicative of ambient temperature. The ambient temperature sensor 112 may located anywhere in vicinity of the compressor 102 or anywhere away from the compressor 102. For example, if the compressor 102 were to be installed on a heavy vehicle application, such as a truck, the ambient temperature sensor 112 may be mounted outside of the truck.

A vehicle speed sensor 109 provides an electrical signal on line 208 to an input port of the air charging system controller 200, which electrical signal is indicative of ground speed of the vehicle. A fan speed sensor 111 provides an electrical signal on line 210 to an input port of the air charging system controller 200, which electrical signal is indicative of fan speed of the vehicle.

The air charging system controller 200 receives as input signals the electrical signals on lines 202, 204, 206, 208, 210 from the compressor temperature sensor 110, the compressor speed sensor 127, the ambient temperature sensor 112, the vehicle speed sensor 109, and the fan speed sensor 111, and provides as an output signal an electrical signal on line 207 to the motor controller 120. The electrical signal on line 207 controls the compressor 102 via the motor controller 120 based upon a compressor control application program, as will be described herein.

The line 207 is a communication link (e.g., a controller area network (CAN)) that supports bidirectional communication (e.g., variable speed requests, status, ON/OFF control signals, etc.) between the air charging system controller 200 and the motor controller 120. Optionally, the air charging system controller 200 is connected on CAN line 212 to communicate with one or more other vehicle controllers 220. The air charging system controller 200 may receive temperature values or speed values via the CAN line 212 from the one or more other vehicle controllers 220. The one or more other vehicle controllers 220 are capable of enhancing performance of the air charging system controller 200 to carry out certain processes within the compressor control application program.

The air charging system controller 200 also provides as an output signal an electrical signal on line 215 to a first lamp 115 of a driver information unit 116, and as another output signal an electrical signal on line 217 to a second lamp 117 of the driver information unit 116. The driver information unit 116 comprises any combination of devices, such as visual devices, audible devices, and haptic devices, for alerting the vehicle driver. As an example, the first lamp 115 may comprise a yellow lamp located in a vehicle driver compartment, and the second lamp 117 may comprise a red lamp located in the vehicle driver compartment. Other combinations of lamp colors are possible. The lamps 115, 117 may comprise light emitting diodes (LEDs) for example, and can be illuminated individually at different times or together at the same time to alert the vehicle driver of a compressor event occurring.

Figure 2:
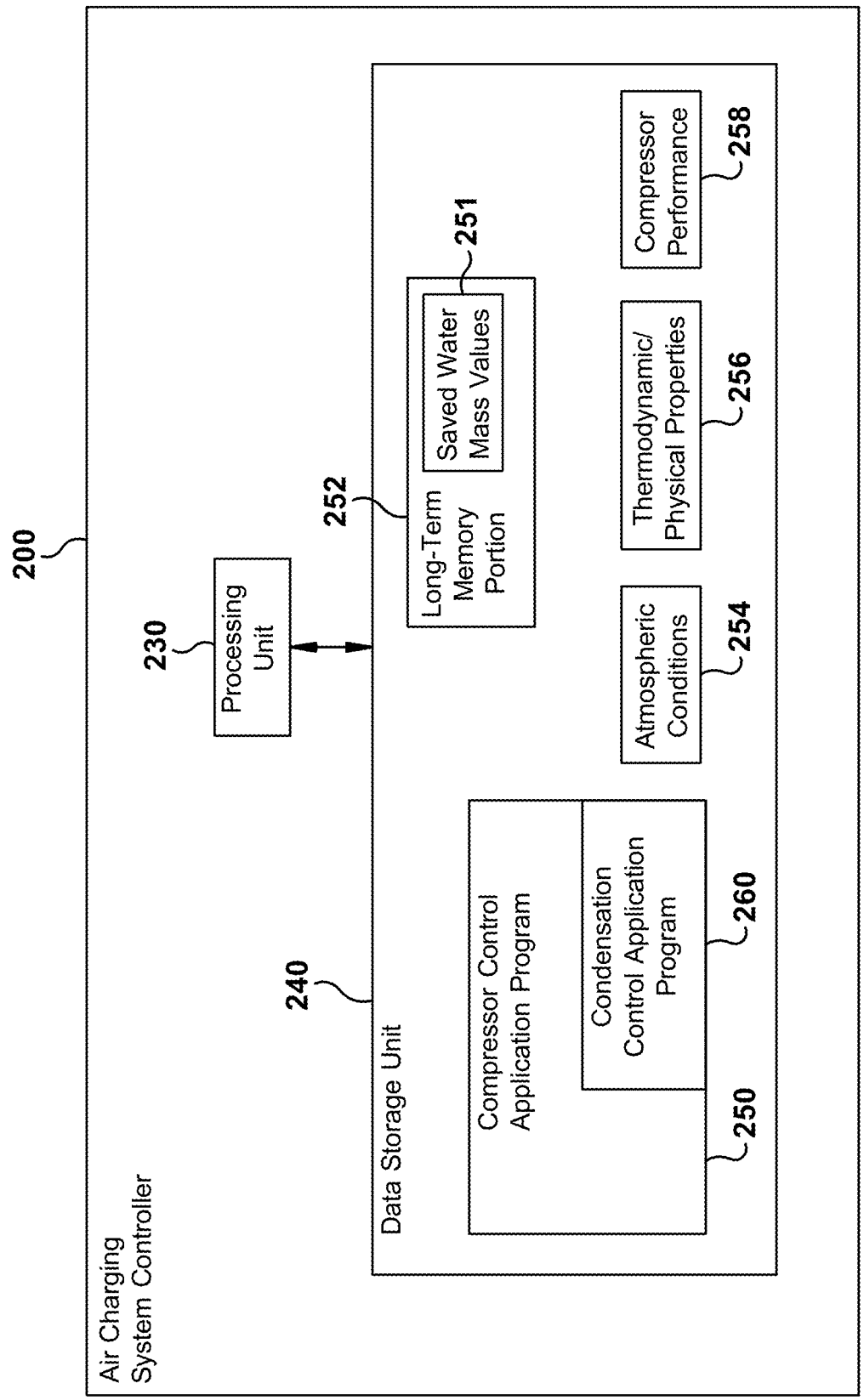
FIG. 2 is an example implementation of an air charging system controller which can be used in the vehicle air charging system of FIG. 1.

Referring to FIG. 2, an example implementation of the air charging system controller 200 of FIG. 1 is illustrated. The air charging system controller 200 includes a processing unit 230 that communicates with a data storage unit 240. The processing unit 230 executes program instructions stored in the data storage unit 240, external data storage unit (not shown), or a combination thereof.

The data storage unit 240 is configured to store the compressor control application program (i.e., a compressor control algorithm), which is designated herein as reference numeral "250" as shown in FIG. 2. The compressor control algorithm 250 comprises a condensation control application program 260 (i.e., a condensation control algorithm).

The data storage unit 240 is also configured with a long-term memory portion 252 that stores water mass values 251 saved during past operations of the compressor 102, as will be described later. The data storage unit 240 is further configured to store atmospheric conditions 254, thermodynamic and physical properties 256, compressor performance characteristics 256, and other programs, data, etc. (not shown) as required.

The processing unit 230 may comprise any type of technology. For example, the processing unit 230 may comprise a dedicated-purpose electronic processor. Other types of processors and processing unit technologies are possible. The data storage unit 240 may comprise any type of technology. For example, data storage unit 240 may comprise random access memory (RAM), read only memory (ROM), solid state memory, or any combination thereof. Other types of memories and data storage unit technologies are possible.

The air charging system controller 200 is responsive to a combination of the signal on line 202 from the compressor temperature sensor 110, the signal on line 204 from the compressor speed sensor 127, the signal on line 206 from the ambient temperature sensor 112, the signal on line 208 from the vehicle speed sensor 109, the signal on line 210 from the fan speed sensor 111, and other data stored in the data storage unit 240 to control the compressor 102.

In accordance with an aspect of the present disclosure, the processing unit 230 executes instructions of the compressor control algorithm 250 to control operation of the compressor 102 and executes instructions of the condensation control algorithm 260 to track water content in the compressor oil of the compressor 102 due to condensation during operation of the compressor 260, as will be described in detail hereinbelow.

In accordance with another aspect of the present disclosure, the processing unit 230 executes instructions of the condensation control algorithm 260 to enable the compressor 102 to run in different modes of operation based upon the amount of water contained in the compressor oil of the compressor 102, as will also be described in detail hereinbelow.

In accordance with yet another aspect of the present disclosure, the processing unit executes instructions of the condensation control algorithm 260 to run the compressor in a normal mode of operation and a limp-home mode of operation. The compressor is able to transition from the normal mode of operation to the limp-home mode of operation but unable to transition from the limp-home mode of operation to the normal mode of operation, as will be described.

Figure 3:
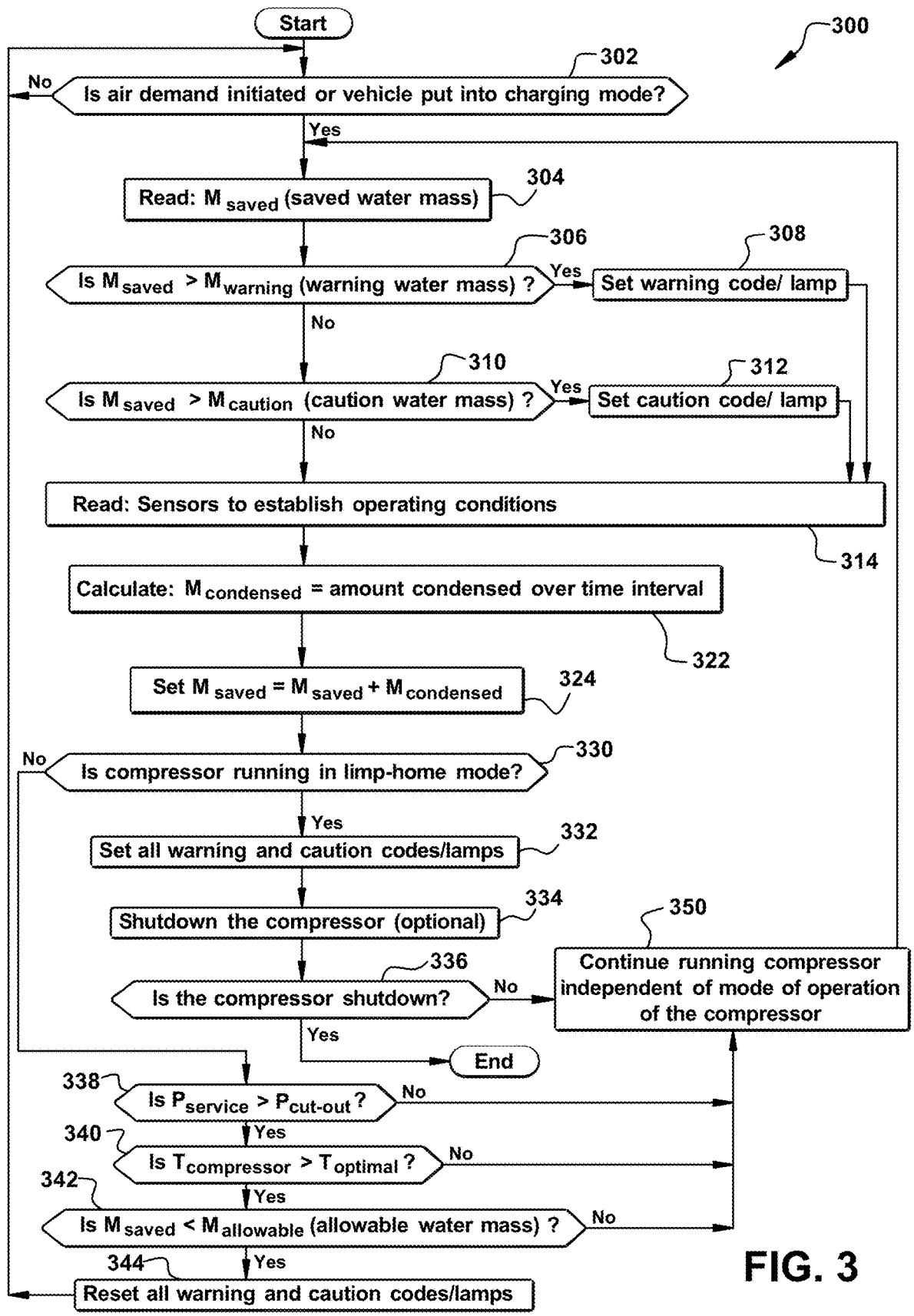
FIG. 3 is a flow diagram depicting an example method for a vehicle in accordance with an embodiment.

Referring to FIG. 3, a flow diagram 300 depicts an example method for a vehicle in accordance with an embodiment. In block 302, a determination is made as to whether a signal is provided, which signal is indicative of an air demand being initiated or the compressor 102 (and therefore the vehicle) being put into charging mode. If the determination in block 302 is negative, the process loops back to block 302 to continue monitoring for a signal that is indicative of an air demand being initiated or the compressor 102 being put into charging mode. If the determination in block is 302 is affirmative, the process proceeds to block 304.

In block 304, a saved water mass value $M_{saved}$ is retrieved from memory, which memory may comprise the data storage unit 240 shown in FIG. 2. The saved water mass value $M_{saved}$ is representative of an amount of water that has previously accumulated in the compressor oil of the compressor 102 and stored in the memory after the compressor 102 was last shut down. The process then proceeds to block 306.

In block 306, a determination is made as to whether the saved water mass value $M_{saved}$ is greater than a warning water mass value $M_{warning}$. The warning water mass value $M_{warning}$ is representative of an amount of water which, whenever an accumulated amount of water in the compressor oil exceeds, causes a warning signal to be generated. If the determination in block 306 is affirmative, the process proceeds to block 308 to set a warning code/lamp, such as illuminating the second lamp 117 shown in FIG. 1, before proceeding to block 314. However, if the determination in block 306 is negative, the process proceeds to block 310.

In block 310, a determination is made as to whether the saved water mass value $M_{saved}$ is greater than a caution water mass value $M_{caution}$. The caution water mass value $M_{caution}$ is representative of an amount of water which, whenever an accumulated amount of water in the compressor oil exceeds, causes a caution signal to be generated. If the determination in block 310 is affirmative, the process proceeds to block 312 to set a caution code/lamp, such as illuminating the first lamp 115 shown in FIG. 1, before proceeding to block 314.

In block 314, all sensors are read to establish operating conditions. The process then proceeds to block 322. In block 322, a series of thermodynamic and heat transfer calculations are performed.

The amount of water condensed $M_{condensed}$ over the time interval since the compressor 102 was started back in block 302 is based on the relative humidity of the inlet air, system pressure and compressor temperature.

Then in block 324, the value of the saved water mass $M_{saved}$ that was read back in block 304 is updated by adding to $M_{saved}$ the amount of water condensed $M_{condensed}$ over the time interval since the compressor 102 was started back in block 302. The updated value of $M_{saved}$ is now saved in place of the previous value of $M_{saved}$. The process proceeds to block 330.

In block 330, a determination is made as to whether the compressor 102 is running in limp-home mode. If the determination in block 330 is negative, the process proceeds to block 338. However, if the determination in block 330 is affirmative, the process proceeds to block 332 to set all warning and caution codes/lamps (e.g., illuminating both the first and second lamps 115, 117) before proceeding to optional block 334.

In optional block 334, the compressor 102 is commanded to shut down. The process then proceeds to block 336. In block 336, a determination is made as to whether the compressor 102 is shut down. If the determination in block 336 is negative, the process proceeds to block 350. However, if the determination in block 336 is affirmative, the process proceeds to block 338.

In block 338, a determination is made as to whether the service brake pressure $P_{service}$ is greater than the cut-out pressure $P_{cut-out}$. If the determination in block 338 is negative, the process proceeds to block 350. However, if the determination in block 338 is affirmative, the process proceeds to block 340 in which a determination is made as to whether the compressor internal temperature $T_{compressor}$ is greater than the optimal compressor internal temperature $T_{optimal}$.

If the determination in block 340 is negative, the process proceeds to block 350. However, if the determination in block 340 is affirmative, the process proceeds to block 342 in which a determination is made as to whether the saved water mass $M_{saved}$ is less than an allowable water mass $M_{allowable}$. If the determination in block 342 is negative, the process proceeds to block 350. However, if the determination in block 342 is affirmative, the process proceeds to block 344 in which any warning code/lamp or caution code/lamp that were set back in blocks 308 and 312 are reset. After the reset, the process returns back to the start at block 302 to continue monitoring if air demand is initiated or the vehicle is in charging mode. The process of the flowchart of FIG. 3 described hereinabove repeats using the latest value of the saved water mass $M_{saved}$ that was updated back in block 324.

When the process proceeds to block 350 from block 336, 338, 340, or block 342, as described above, the compressor 102 continues to run independent of the mode of operation of the compressor 102 at that moment. Different modes of operation of the compressor 102 are described hereinbelow with reference to FIG. 4. The process from block 350 then returns back to block 304 to read the latest value of the saved water mass $M_{saved}$ that was updated back in block 324. The process of the flowchart of FIG. 3 described hereinabove repeats using the updated saved water mass $M_{saved}$.

Figure 4:
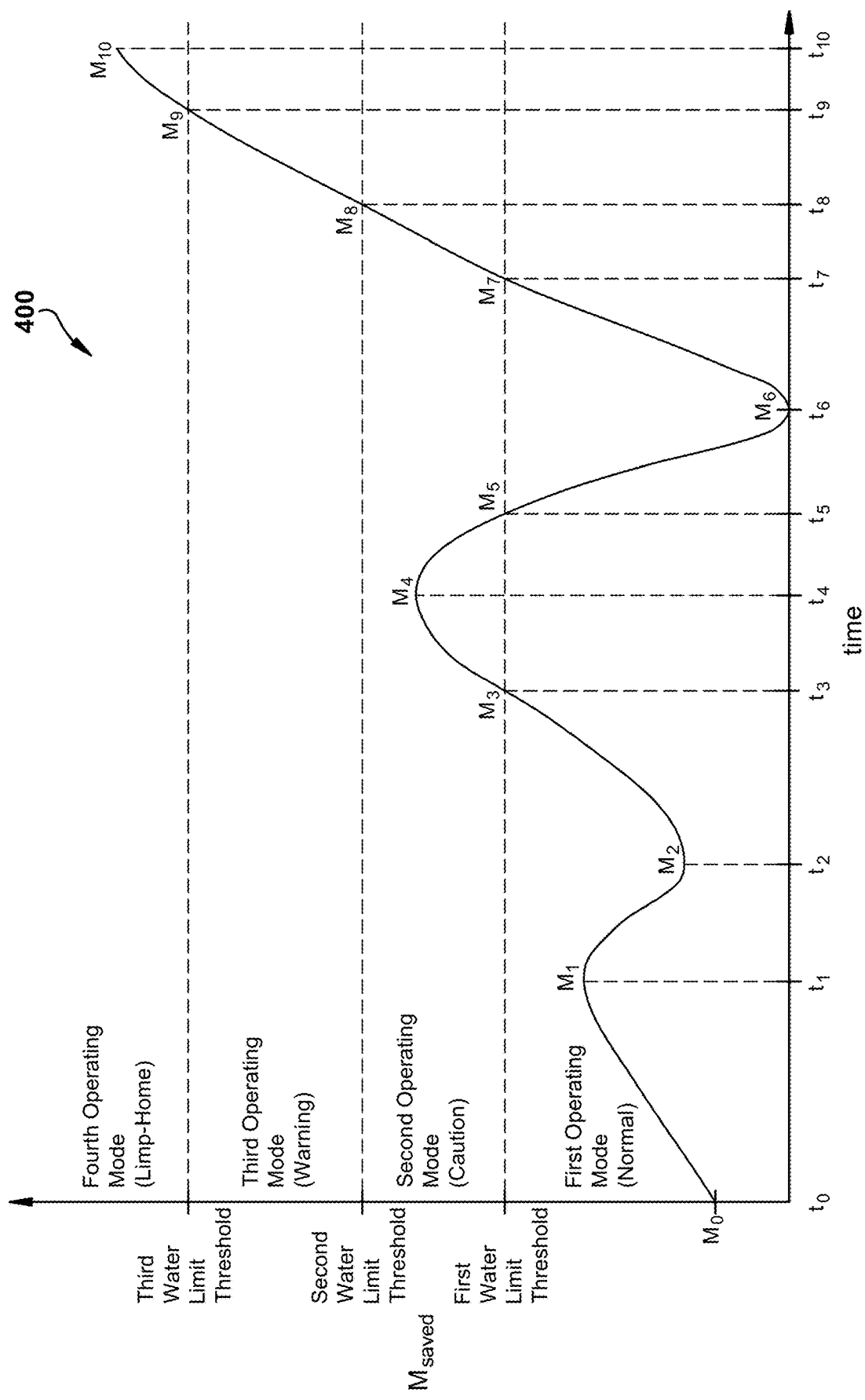
FIG. 4 is a diagram depicting different modes of operation of a compressor during build-up and burn-off of water in compressor oil of the compressor.

Referring to FIG. 4, an example diagram 400 depicts different modes of operation of the compressor 102 during build-up and burn-off of water in compressor oil of the compressor 102. The diagram of FIG. 4 is a line-graph that shows the saved water mass $M_{saved}$ along the vertical axis and time along the horizontal axis. At time to, the saved water mass $M_{saved}$ has a value of $M_0$. During operation of the compressor 102 from time $t_0$ to $t_1$, the amount of water condensation in the compressor oil builds up and the saved water mass has a value of $M_1$. Then from time $t_1$ to $t_2$, the amount of condensation in the compressor oil burns off, reducing the saved water mass to a value of $M_2$.

The amount of water condensation builds up again until the saved water mass reaches a value of $M_3$ at time $t_3$. The value of $M_3$ is a first water limit threshold which, when reached and exceeded, moves from a first mode of operation (i.e., below the first water limit threshold) of the compressor 102 to a second mode of operation (i.e., above the first water limit threshold) of the compressor 102. In the first mode of operation when the saved water mass in the compressor oil is below the first water limit threshold, the compressor 102 is running normally. In the second mode of operation when the saved water mass in the compressor oil reaches and exceeds the first water limit threshold, the first lamp 115 shown in FIG. 1 is set (i.e., activated) to provide the vehicle driver with a caution message.

The amount of water condensation build up may continue until the saved water mass reaches a value of $M_4$ at time $t_4$ and then burns off again until the saved water mass reaches and drops below the saved water mass of $M_5$ at time $t_5$. The value $M_5$ is the same as the value of $M_3$, which is the first water limit threshold. From time to, the amount of water condensation burn off may continue until the saved water mass reaches a value of about zero represented as $M_6$ at time to.

As shown in FIG. 4, the amount of water condensation in the compressor oil builds up again until the saved water mass reaches a value of $M_7$ at time $t_7$, and then continues to build up until the saved water mass reaches a value of $M_8$ at time to. The value of $M_7$ is the same as the values of $M_3$ and $M_5$, which is the first water limit threshold. The value of $M_5$ is a second water limit threshold which, when reached and exceeded, moves from a second mode of operation (i.e., between the first water limit threshold and the second water limit threshold) of the compressor 102 to a third mode of operation (i.e., above the second water limit threshold) of the compressor 102. In the third mode of operation when the saved water mass in the compressor oil reaches and exceeds the second water limit threshold, the second lamp 117 shown in FIG. 1 is set to provide the vehicle driver with a warning message.

If the compressor 102 continues to run after the saved water mass reaches the value of $M_8$ at time to, the saved water mass might reach a value of $M_9$ at time to. The value of $M_9$ is a third water limit threshold which, when reached and exceeded, moves from the third mode of operation (i.e., between the second water limit threshold and the third water limit threshold) of the compressor 102 to a fourth mode of operation (i.e., above the third water limit threshold) of the compressor 102. The compressor 102 may continue to run in the fourth mode of operation until the saved water mass reaches a value of Mio at time $t_{10}$.

The fourth mode of operation is a limp-home operation in which the compressor 102 needs immediate remedial action, or optionally needs to be shut down (see block 334 in the flow diagram of FIG. 3). In the fourth mode of operation when the saved water mass in the compressor oil reaches and exceeds the third water limit threshold, the compressor 102 is unable to be changed to a different mode of operation (i.e., the first, second, or third modes of operation) even if the saved water mass were to drop below the third, second, or first water limit thresholds. Unlike the first, second, and third modes of operation where the compressor 102 can go into and out of these three different modes, once the compressor 102 goes into the fourth mode of operation, the compressor 102 remains in the fourth mode and is unable to go into and out of the fourth mode. The compressor 102 is "locked" into the fourth mode of operation until remedial action is taken.

When in the fourth mode of operation, the compressor 102 is likely to be full of water, and so immediate remedial action needs to be taken. An example of a remedial action that can be taken on the compressor 102 includes slowing the vehicle down. Another example of a remedial action includes limiting the miles that the vehicle can be driven before vehicle shut down. Optionally, the compressor 102 can be shut down.

It should be apparent that when the compressor 102 is in the fourth mode of operation, the first lamp 115 or the second lamp 117, or both, may be set and flashing and unable to be reset, for example. Also, the vehicle may be slowed down, the vehicle may be limited to miles that can be driven until vehicle shut down, the total time of operation of the compressor 102 in the fourth mode may be logged, and a maximum time allowed of the compressor 102 to operate in the fourth mode may be set. Other messages, limitations, diagnostics, and recordings of vehicle and/or compressor information are possible when the compressor 102 is in the fourth mode of operation.

It should further be apparent that three water limit thresholds (i.e., the first, second, and third water limit thresholds) define the four operating modes of the compressor 102. In one example, the first water limit threshold is between about 150 grams of water and about 200 grams of water. The second water limit threshold is between about 200 grams of water and about 250 grams of water. The third water limit threshold is between about 250 grams of water and about 300 grams of water.

The first operating mode is defined when the saved water mass $M_{saved}$ in the compressor oil is below the first water limit threshold, the second operating mode is defined when the saved water mass $M_{saved}$ in the compressor oil is between the first water limit threshold and the second water limit threshold, and the third operating mode is defined when the saved water mass $M_{saved}$ in the compressor oil is between the second water limit threshold and the third water limit threshold. The fourth mode of operation is defined when the saved water mass $M_{saved}$ in the compressor oil is above the third water limit threshold.

It should also be apparent that the value of the saved water mass $M_{saved}$ is saved when operation of the compressor is interrupted (e.g., shut down). Such interruption can occur at any time along the horizontal time axis of FIG. 4. The rate at which the saved water mass $M_{saved}$ is calculated, updated, and saved may vary. For example, the saved water mass $M_{saved}$ may be calculated, updated, and saved every second. Other rates are possible.

It should further be apparent that a net rate of condensation of water in the compressor oil is calculated during operation of the compressor 102 over a first time interval of a plurality of time intervals. A running total of how much water is in the compressor oil at any given time over the first time interval is kept and stored in memory. The stored running total of how much water was in the compressor oil at the end of the first time interval is retrieved from the memory when the compressor 102 is subsequently restarted to operate over a second time interval of the plurality of time intervals. A net rate of condensation of water in the compressor oil is then calculated during operation of the compressor over the second time interval. A running total of how much water is in the compressor oil at any given time over the second time interval is kept and is based upon the retrieved running total of how much water was in the compressor oil at the end of the first time interval.

The plurality of time intervals comprises the first time interval, the second time interval that follows the first time interval, and any time interval which follows the second time interval (e.g., a third time interval, a fourth time interval, etc.). It is conceivable that a software tool may provide a "reset" of the plurality of time intervals. As an example, the software tool may be used to reset the plurality of time intervals to a "first time interval" after a compressor oil change.

Figure 5:
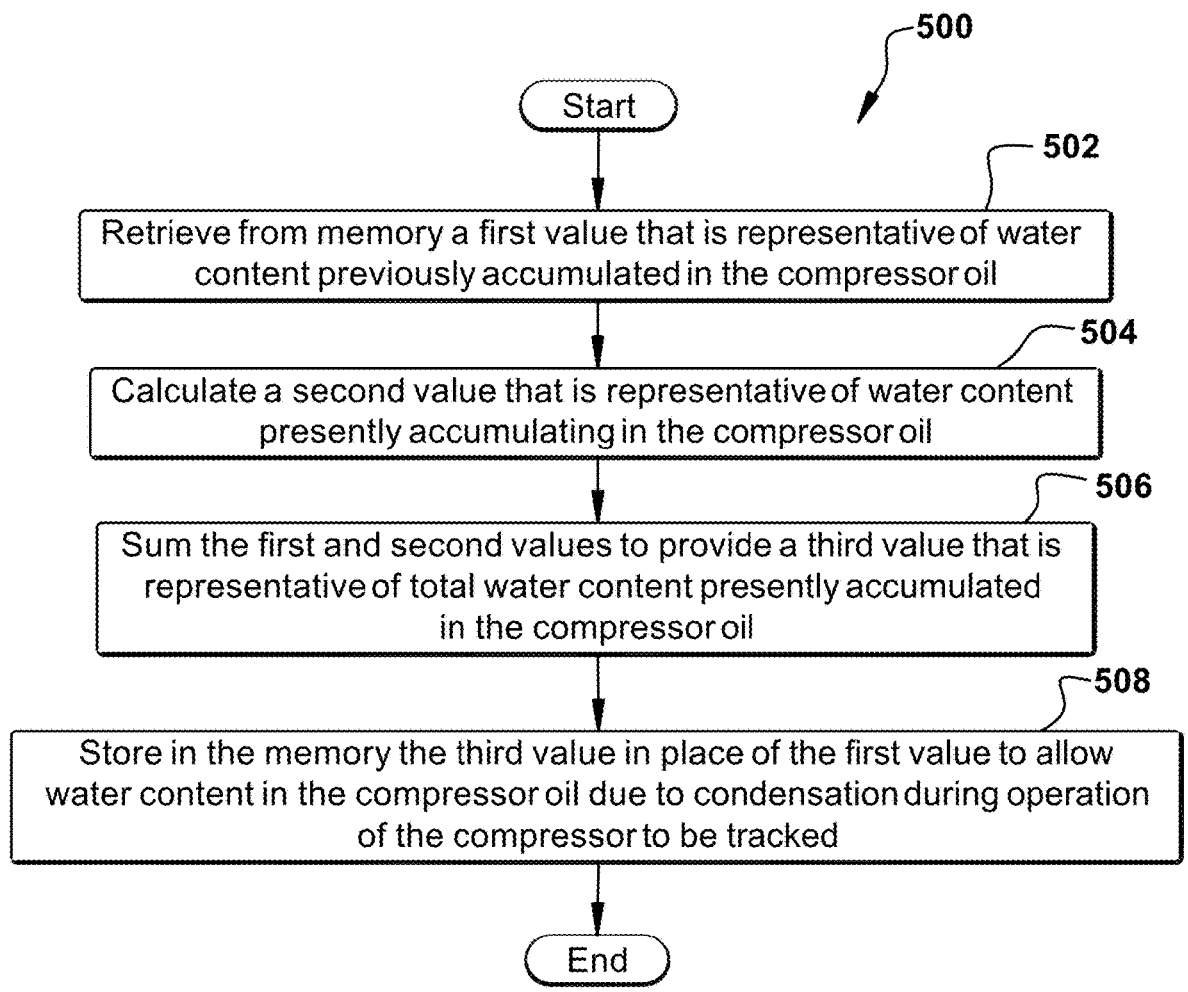
FIG. 5 is a flow diagram depicting an example method for a vehicle in accordance with another embodiment.

Referring to FIG. 5, a flow diagram 500 depicts an example method for a vehicle in accordance with another embodiment. The method is for operating a vehicle air compressor having compressor oil to track water content in the compressor oil due to condensation during operation of the compressor. In block 502, a first value that is representative of water content previously accumulated in the compressor oil is retrieved from memory. The process proceeds to block 504 in which a second value that is representative of water content presently accumulating in the compressor oil is calculated.

Then in block 506, the first and second values are summed to provide a third value that is representative of total water content presently accumulated in the compressor oil. In block 508, the third value is stored in the memory in place of the first value when the compressor is shut down. This allows water content in the compressor oil due to condensation during operation of the compressor to be tracked when the compressor is restarted. The process then ends.

In some embodiments, an amount of water entering the compressor is calculated based upon specific humidity of inlet air into the compressor while the compressor is running over a time interval, an amount of water exiting the compressor is calculated based upon specific humidity of discharge air from the compressor while the compressor is running over the time interval, and the calculated amount of water exiting the compressor is subtracted from the calculated amount of water entering the compressor to provide the calculated second value that is representative of water content presently accumulating in the compressor oil.

In some embodiments, the method is performed by a computer having a memory executing one or more programs of instructions which are tangibly embodied in a program storage medium readable by the computer.

A number of advantages are provided by employing the condensation control algorithm 260 disclosed herein. One advantage is that the condensation control algorithm 260 controls operation of the compressor 102 to continuously calculate water condensation (i.e., water build-up) or water evaporation (i.e., water burn-off), and keep track of how much water is in the compressor oil at all times. This provides near real-time monitoring of the water content in the compressor oil.

Another advantage is that the condensation control algorithm 260 controls operation of the compressor 102 to continuously run the compressor 102 independent of the operating mode of the compressor (see block 350 in the flow diagram 300 of FIG. 3). The continuous running of the compressor 102 independent of the operating mode of the compressor 102 allows more water to be burned off than otherwise would have burned off if the compressor 102 were to be shut down. The result is improved reliability of the compressor 102 as well as avoidance of water accumulation in the compressor oil during operation of the compressor 102.

Still another advantage is that different water limit thresholds of the condensation control algorithm 260 allow messages (e.g., codes and/or lamps) to be generated and provided to alert a vehicle driver to take necessary actions to preserve service life of the compressor 102. For example, when the saved water mass $M_{saved}$ reaches the first water limit threshold to move from the first mode of operation to the second mode of operation, a message such as "Frequent interruptions to air compressor cycle detected. Leave vehicle ON, for air compressor to complete run cycle" could be displayed to the vehicle driver. As another example, when the saved water mass M saved reaches the second water limit threshold to move from the second mode of operation to the third mode of operation, a message such as "Compressor oil quality is severely degraded . . . oil change is required" could be provided to the vehicle driver. As yet another example, when the saved water mass $M_{saved}$ reaches the third water limit threshold to move from the third mode of operation to the fourth mode of operation, a message such as "Flashing red light . . . continued compressor operation will result in compressor damage" could be provided to the vehicle driver.

Yet another advantage is that the condensation control algorithm 260 enables the vehicle air charging system 100 to find particular application in conjunction with an electric vehicle while the electric vehicle is charging. For example, if the saved water mass $M_{saved}$ is above a specified limit (e.g., the allowable water mass $M_{allowable}$) while the electric vehicle is charging, then the compressor 102 could be turned on and the water would be burned off without affecting the vehicle's battery state of charging.

Another advantage is that software of the condensation control algorithm 260 can be used to recognize changes in performance. As an example, a typical or "normal" rate of temperature change (i.e., slope) may be established for the compressor 102 running at a certain ambient temperature. If the slope changes during running of the compressor 102, then such slope change can be used to recognize a potential problem or onset of a potential failure in the earliest stages.

Although the above description describes the condensation control algorithm 260 being part of the compressor control algorithm 250, it is conceivable that the condensation control program 260 be separate, in whole or in part, from the compressor control algorithm 250. Moreover, it is conceivable that the condensation control program 260 as well as the compressor control program 250 be stored, in whole or in part, in one or more data storage units associated with other vehicle systems.

Also, although the above description describes the vehicle air charging system 100 including the components shown in FIG. 1, it is conceivable that vehicle air charging system 100 need not include all of the components shown to track water content in the compressor oil of the compressor 102. Moreover, it is conceivable that another controller be used to implement the condensation control algorithm 260. For example, the motor controller 120 or the one or more other vehicle controllers 220 shown in FIG. 1 may be used to implement the condensation control algorithm 260 described herein. Any controller on the vehicle (e.g., an air dryer controller, a brake controller, a dash controller, etc.) may be used.

Also, although the above-description of FIG. 1 shows the air charging system controller 200 receiving and processing all sensor signals, it is conceivable that the one or more other vehicle controllers 220 receive and process some or all sensor signals before providing any needed signals via CAN line 212 to the air charging system controller 200.

Further, although the above-description describes the vehicle air charging system 100 being used in conjunction with an air braking system of a heavy vehicle, it is conceivable that the vehicle air charging system 100 may be used in other types of heavy vehicles, such as busses for example.

Also, although the above description describes the compressor 102 as being a rotating type of compressor (i.e., a screw compressor) used in a heavy vehicle application, it is conceivable that any type of compressor (including non-rotating compressors) that uses oil as a lubricant may be used. It is also conceivable that such compressor may be used in any type of application (including non-vehicle applications).

The above-described example methods may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An apparatus for controlling a vehicle air compressor having compressor oil to track water content in the compressor oil due to condensation during operation of the compressor over a plurality of time intervals, the apparatus comprising:

a data storage unit arranged to store a condensation control algorithm; and a processing unit arranged to apply the condensation control algorithm to:

calculate a net rate of condensation of water in the compressor oil during operation of the compressor over a first time interval of the plurality of time intervals;

maintain a running total of how much water is in the compressor oil at any given time over the first time interval to enable the compressor to operate in different modes of operation based upon the running total of how much water is in the compressor oil;

store in a memory the running total of how much water is in the compressor oil at the end of the first time interval, when the compressor is shut down;

retrieve the running total of how much water was in the compressor oil from the memory when the compressor is subsequently restarted;

calculate a net rate of condensation of water in the compressor oil as the compressor operates over a second time interval of the plurality of time intervals;

maintain a running total of how much water is in the compressor oil at any given time over the second time interval based upon the retrieved running total of how much water was in the compressor oil at the end of the first time interval;

set a caution code whenever the running total of how much water is in the compressor oil during any time interval of the plurality of time intervals is greater than a first water limit threshold; and set a warning code whenever the running total of how much water is in the compressor oil during any time interval of the plurality of time intervals is greater than a second water limit threshold, which is greater than the first water limit threshold, wherein the compressor is operating in a normal mode of operation when the running total of how much water is in the compressor oil during any time interval of the plurality of time intervals is below the first water limit threshold value, a caution mode of operation when the running total of how much water is in the compressor oil during any time interval of the plurality of time intervals is between the first water limit threshold value and the second water limit threshold value, and a warning mode of operation when the running total of how much water is in the compressor oil ding any time interval of the plurality of time intervals is above the second water limit threshold value.

2. The apparatus according to claim 1, wherein (i) the compressor is in a limp-home mode of operation when the running total of how much water is in the compressor oil during any time interval of the plurality of time intervals is above a third water limit threshold value which is greater than the second water limit threshold value, and (ii) the compressor is unable to transition from the limp-home mode of operation to another mode of operation once the compressor transitions into the limp-home mode of operation.

3. A method of operating a vehicle air compressor having compressor oil to track water content in the compressor oil due to condensation during operation of the compressor, the method comprising:

retrieving from memory a first value that is representative of water content previously accumulated in the compressor oil over a first time interval, when the compressor is restarted;

calculating a second value that is representative of water content presently accumulating in the compressor oil over a second time interval;

summing the first and second values to provide a third value that is representative of total water content presently accumulated in the compressor oil;

storing in the memory the third value in place of the first value to allow water content in the compressor oil due to condensation during operation of the compressor to be tracked;

setting a caution code when the third value is greater than a first water limit threshold; and setting a warning code when the third value is greater than a second water limit threshold, which is greater than the first water limit threshold, wherein the compressor is operating in a normal mode of operation when the third value is below the first water limit threshold value, a caution mode of operation when the third value is between the first water limit threshold value and the second water limit threshold value, and a warning mode of operation when the third value is above the second water limit threshold value.

4. The method according to claim 3, wherein calculating a second value that is representative of water content presently accumulating in the compressor oil includes:

calculating an amount of water being condensed based upon a relative humidity of inlet air to the compressor, a pressure of an air charging system and a temperature of the compressor while the compressor is running over the second time interval to provide the calculated second value that is representative of water content presently accumulating in the compressor oil.

5. The method according to claim 3, wherein the method is performed by a computer having a memory executing one or more programs of instructions which are tangibly embodied in a program storage medium readable by the computer.

* * * * *